(12) United States Patent
Takeuchi

(10) Patent No.: US 9,716,679 B2
(45) Date of Patent: *Jul. 25, 2017

(54) INFORMATION PROCESSING APPARATUS AND CELLULAR PHONE TERMINAL

(71) Applicants: SONY CORPORATION, Tokyo (JP); SONY MOBILE COMMUNICATIONS INC., Tokyo (JP)

(72) Inventor: Ryosuke Takeuchi, Saitama (JP)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 246 days.

This patent is subject to a terminal disclaimer.

(21) Appl. No.: 14/540,374

(22) Filed: Nov. 13, 2014

(65) Prior Publication Data

US 2015/0074550 A1    Mar. 12, 2015

Related U.S. Application Data

(63) Continuation of application No. 12/200,989, filed on Aug. 29, 2008, now Pat. No. 8,902,166.

(30) Foreign Application Priority Data

Sep. 3, 2007 (JP) ................................. 2007-227431

(51) Int. Cl.
*G06F 3/048* (2013.01)
*H04L 12/58* (2006.01)
(Continued)

(52) U.S. Cl.
CPC ............ *H04L 51/046* (2013.01); *G06F 3/048* (2013.01); *G06F 3/0482* (2013.01);
(Continued)

(58) Field of Classification Search
CPC ................ G06F 3/048; H04M 1/2477; H04M 1/72522–1/72561; H04M 1/72583
(Continued)

(56) References Cited

U.S. PATENT DOCUMENTS 7,142,889 B1    11/2006  Okagaki
2004/0242279 A1  12/2004  Costanzo et al.
(Continued)

FOREIGN PATENT DOCUMENTS

CN    1881843      12/2006
EP    1 734 726    12/2006
(Continued)

*Primary Examiner* — Michael Pervan
(74) *Attorney, Agent, or Firm* — Haug Partners LLP; William S. Frommer

(57) ABSTRACT

Disclosed is an information processing apparatus including a display unit displaying information on a display screen, an operation unit including a text input key, and a control unit. The control unit displays text in response to input from the operation unit in a state of displaying an initial screen on the display screen, shows an application using text to a user for selection, starts up the application in accordance with the user's selection, and executes the application, using the text inputted from the operation unit.

5 Claims, 7 Drawing Sheets

(51) Int. Cl.
*H04M 1/725* (2006.01)
*G06F 3/0482* (2013.01)

(52) U.S. Cl.
CPC ... *H04M 1/72522* (2013.01); *H04M 1/72552* (2013.01); *H04M 1/72583* (2013.01); *H04M 1/72561* (2013.01); *H04M 2250/70* (2013.01)

(58) Field of Classification Search
USPC .......... 345/168–172; 455/566; 715/700–866
See application file for complete search history.

(56) References Cited

U.S. PATENT DOCUMENTS

2005/0114770 A1* 5/2005 Sacher ................. G06F 17/276
715/261
2007/0298850 A1 12/2007 Miyata et al.
2008/0117305 A1* 5/2008 Rogers .................... G03B 7/08
348/222.1

FOREIGN PATENT DOCUMENTS

| | | |
|---|---|---|
| EP | 1 780 642 | 5/2007 |
| EP | 1 786 186 | 5/2007 |
| JP | 2002-366288 | 12/2002 |
| JP | 2007-200243 | 8/2007 |
| JP | 2009-31971 | 2/2009 |
| WO | WO 2006/052089 | 5/2006 |

\* cited by examiner

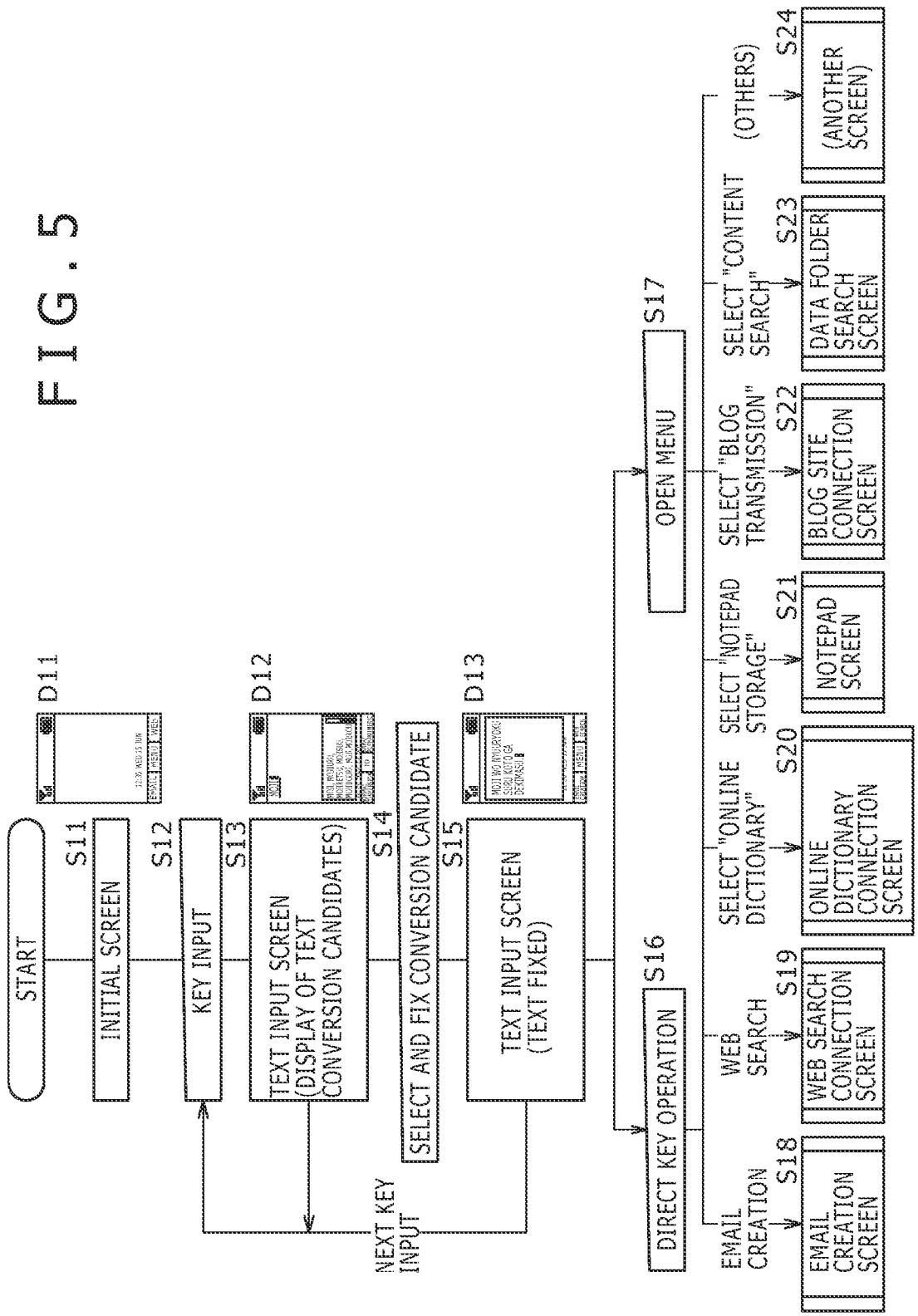

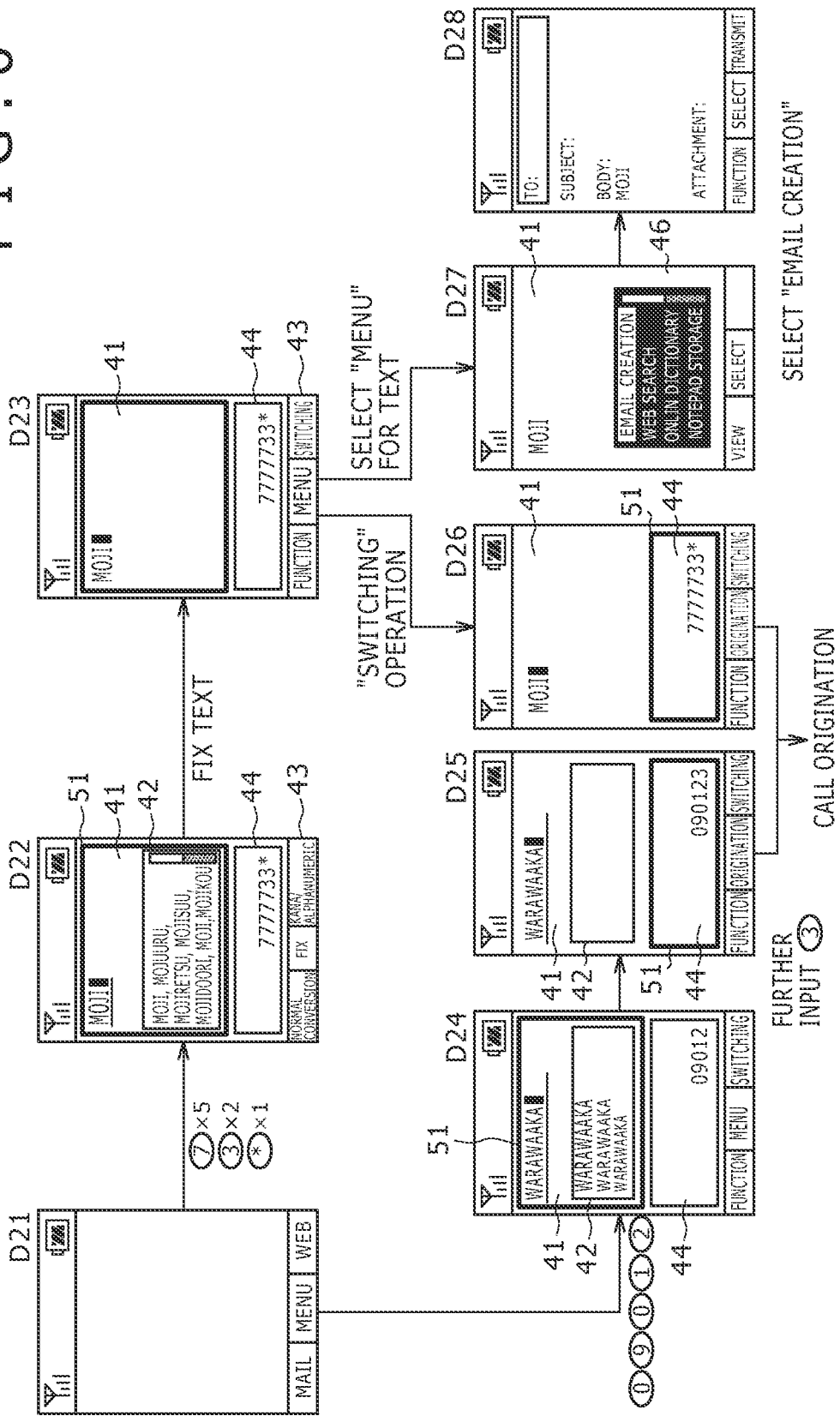

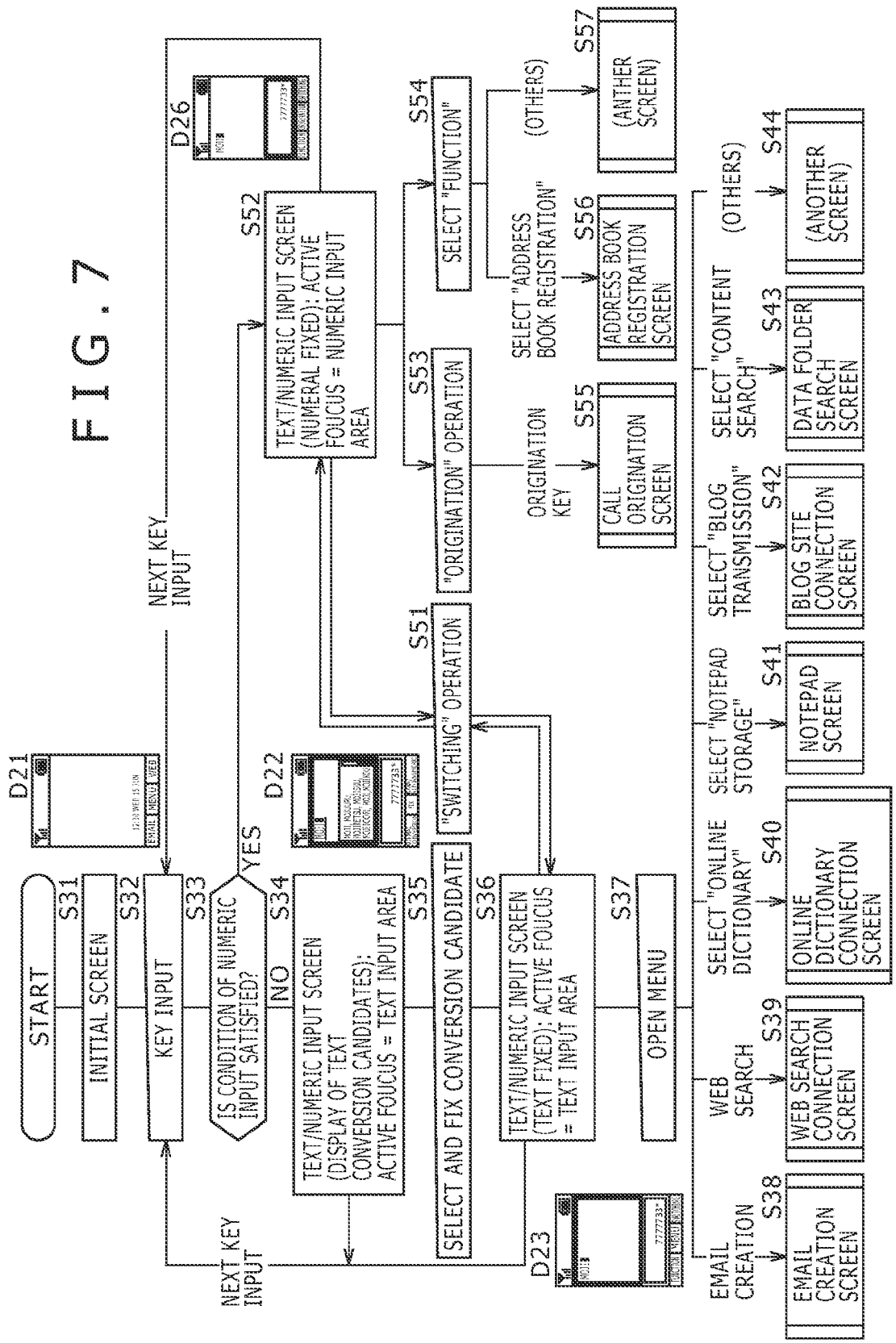

INFORMATION PROCESSING APPARATUS AND CELLULAR PHONE TERMINAL

This is a continuation of application Ser. No. 12/200,989, filed Aug. 29, 2008, which is entitled to the priority filing date of Japanese application no. 2007-227431, filed Sep. 3, 2007, the entirety of which is incorporated herein by reference.

CROSS REFERENCES TO RELATED APPLICATIONS

The present invention contains subject matter related to Japanese Patent Application JP 2007-227431 filed in the Japanese Patent Office on Sep. 3, 2007, the entire contents of which being incorporated herein by reference.

BACKGROUND OF THE INVENTION

1. Field of the Invention

The present invention relates to an information processing apparatus and a cellular phone terminal having the function of inputting text on a display screen.

2. Description of the Related Art

In a small-sized mobile terminal intended primarily to function as a telephone, such as a cellular phone terminal; a function for inputting text in various applications as well as inputting a number for making a call is assigned to a numeric keypad (including numerals 0 to 9 and symbols * and #) commonly equipped thereon. That is, a plurality of kana characters and alphabetical letters are usually assigned to each numeric key.

In the past, cellular phone terminals, in the case of operating such numeric keys in a standby state after power-on, that is, on a standby screen, generally have only functions associated with numerals including inputting a telephone number for making a call.

On the other hand, Patent Document 1 (JP-A No. 2006-60768) discloses a technique for retrieving and displaying a desired destination by depressing a predetermined function key (email key) after inputting a keypad numeric string corresponding to the keyword of the desired email destination address on the standby screen of a cellular phone terminal. For example, in the case of searching for "SUZUKI HANAKO", if numerals "3", "3", and "2" corresponding to "SU", "ZU", and "KI" respectively are inputted, "SUZUKI HANAKO", "SASAKI ICHIRO", and others which correspond to a combination of these numeric keys are retrieved from registration information and outputted as candidates.

Further, Non-Patent Document 1 (Access to various functions by text input from a standby screen—Tegic "T9 discovery tool", Internet search on Aug. 16, 2007 URL: http://plusd.itmedia.co.jp/mobile/articles/0702/13/news070.html) discloses software for quick access to network contents and services provided by menu screens, various applications, contents, and communication operators by start-up of a predictive search interface upon input of text on the standby screen of a cellular phone terminal. For example, upon input of numerals "6" and "2" assigned to letters "M" and "A" respectively, a mail application (mailer), a mapping application, and the like are displayed as a search result. A user can select a desired application from the displayed applications to start up the application.

SUMMARY OF THE INVENTION

In the techniques described in Patent Document 1 and Non-Patent Document 1, when a numeric string is inputted on the standby screen as an initial screen, it is possible to retrieve and output registration information and applications associated with a character string corresponding to the numeric string.

However, the above-described techniques are intended to retrieve registration information and applications (or functions), but are not intended to directly input arbitrary text on the initial screen.

In the case of making a call with a recent cellular phone terminal, there are many cases where a call is originated by using a telephone number recorded as an incoming/outgoing call or using a telephone number registered in an address book, instead of manually inputting a telephone number. On the other hand, communication tools, such as email and Web, which make heavy use of text are frequently and increasingly used. Accordingly, if it is possible to input arbitrary text on the initial screen, the improvement of operability can be expected.

The present invention has been made in view of such circumstances, and it is desirable to improve the usability of a function accompanied with text input in an information processing apparatus. Further, it is desirable to improve the usability of a function accompanied with text input without impairing the operability of numeric input in a cellular phone terminal.

An information processing apparatus according to an embodiment of the present invention includes a display unit displaying information on a display screen, an operation unit including a text input key, and a control unit. The control unit displays text in response to input from the operation unit in a state of displaying an initial screen on the display screen, shows an application using text to a user for selection, starts up the application in accordance with the user's selection, and executes the application, using the text inputted from the operation unit. With this configuration, the user can input text directly on the initial screen by operating the operation unit, select a desired application from displayed applications, and use the text for the application.

A cellular phone terminal according to an embodiment of the invention includes a display unit displaying information on a display screen, an operation unit using a numeric keypad as a text input key, and a control unit. The control unit displays text in response to input from the operation unit in a state of displaying a standby screen on the display unit, shows a use application to a user for selection, starts up the application in accordance with the user's selection, and executes the application, using information inputted from the operation unit.

In the cellular phone terminal, there are preferably provided a text input area for displaying input information as text and a numeric input area for displaying input information as a numeral. The control unit determines based on a predetermined condition whether input is numeric input or text input, activates either the text input area or the numeric input area based on a determination result, and uses, for the application, information inputted in an activated input area at start-up of the application.

Other configurations and operational advantages of the invention will be described as follows.

According to the invention, the user can perform text input directly on the initial screen where direct text input cannot be performed in the past, and can start up a desired application, using the text. Consequently, it becomes possible to improve the usability of a function accompanied with text input. Further, a user who frequently uses text input can use a desired function with a smaller number of operations.

Further, in the cellular phone terminal, it is possible to achieve the function of displaying text instead of numerals at the time of operating the numeric keypad on the standby screen, and thereby quickly use functions other than a telephone function, that is, functions frequently used in the cellular phone terminal such as email creation and Web search. Further, it is possible to prevent impairment of the operability of telephone number input by activating the numeric input based on the predetermined condition.

BRIEF DESCRIPTION OF THE DRAWINGS

Embodiments of the present invention will be described in detail based on the following figures, wherein:

FIG. 5 is a flowchart showing a procedure corresponding to the first operation example shown in FIG. 4;

FIG. 6 is an illustration showing a screen transition example of a display unit illustrating a second operation example according to an embodiment of the invention; and FIG. 7 is a flowchart showing a procedure corresponding to the second operation example shown in FIG. 6.

DESCRIPTION OF THE PREFERRED EMBODIMENTS

Hereinafter, a preferred embodiment of the present invention will be described with reference to the accompanying drawings.

Figure 1:
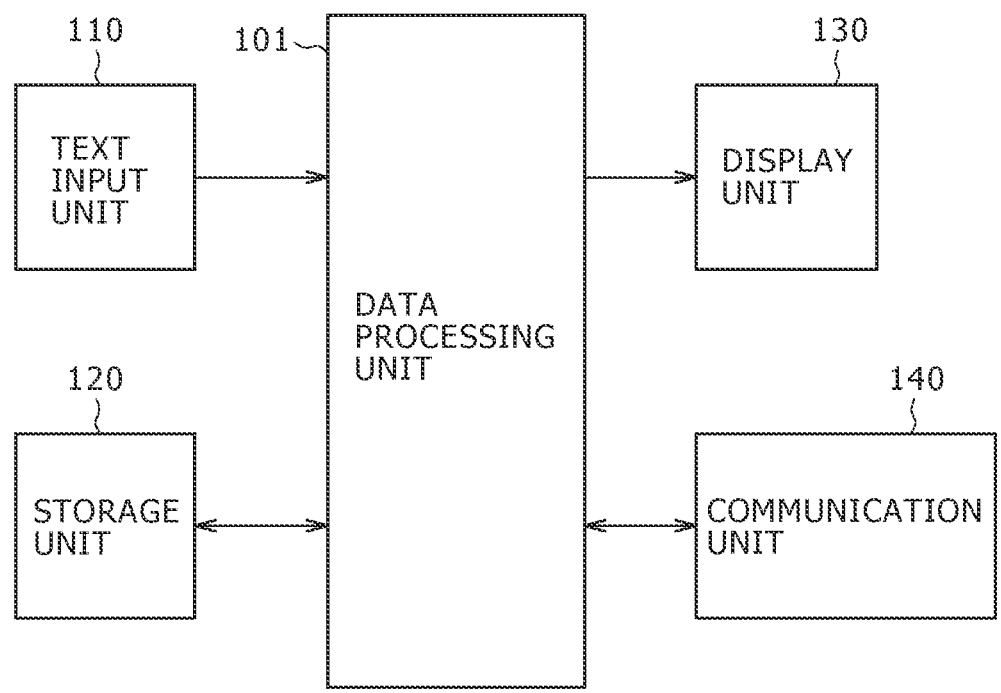
FIG. 1 is a schematic block diagram of an information processing apparatus according to an embodiment of the present invention.

FIG. 1 is a schematic block diagram of an information processing apparatus 100 according to an embodiment of the invention. A data processing unit 101 has a control device such as a CPU (Central Processing Unit) (not shown), controls each unit, and performs necessary data processing. A text input unit 110 has an operation unit including a numeric keypad and various control keys or an operation unit such as a keyboard, and accepts an instruction from a user and an information input. A storage unit 120 has a storage device for storing programs executed by the CPU of the data processing unit 101 and various kinds of data. A display unit 130 includes a display device such as an LCD or an organic EL, and displays various kinds of information such as text and images on a display screen to present information to a user. A communication unit 140 communicates with external devices, and includes the function of telephone calls and connections to the Internet.

Figure 2:
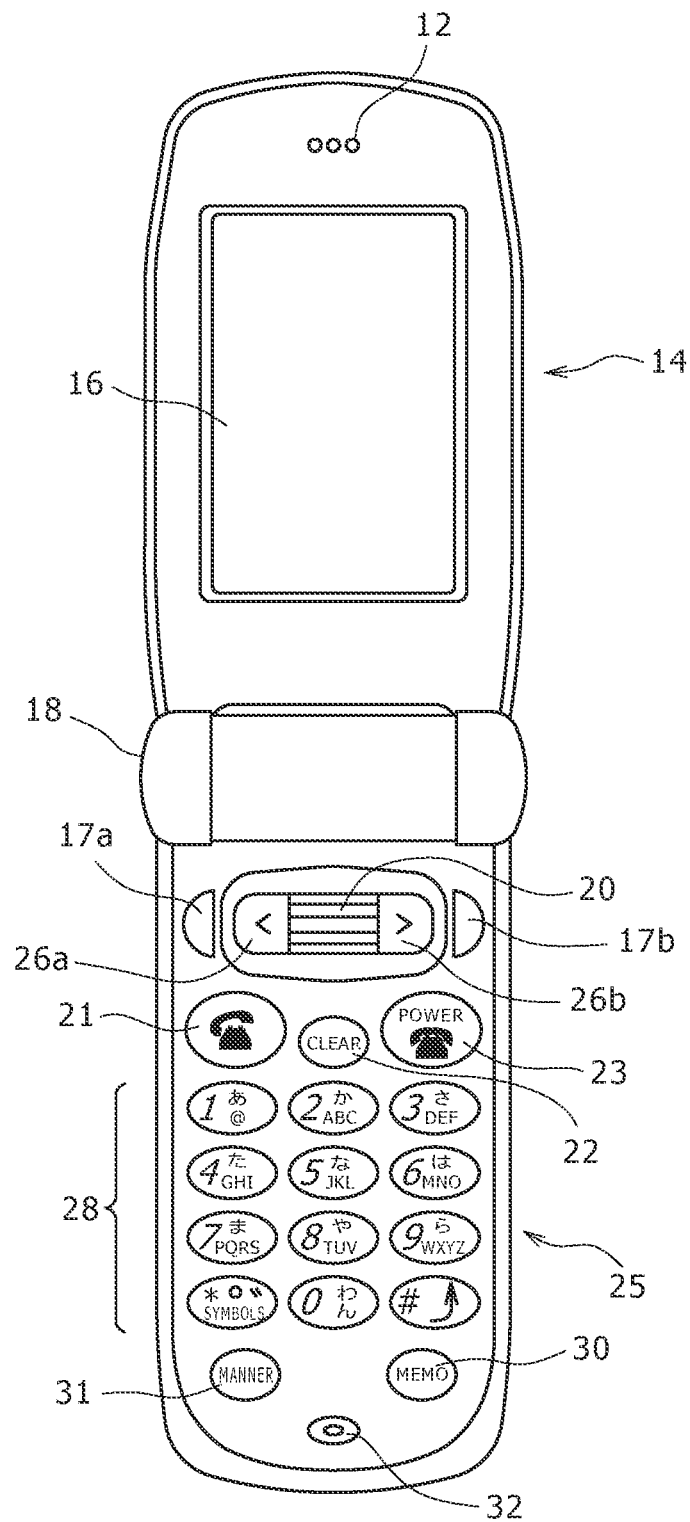
FIG. 2 is an external view of a cellular phone terminal as one example of the information processing apparatus shown in FIG. 1.

FIG. 2 is an external view of a cellular phone terminal 200 as one example of the information processing apparatus 100 according to this embodiment. While the cellular phone terminal 200 indicates a so-called flip phone, the invention is applicable to cellular phone terminals of any type including a straight type and a slide type. FIG. 2 is a front view showing an opened flip phone.

The cellular phone terminal 200 has a hinge 18 and also has an upper cabinet 14 and a lower cabinet 25 which are coupled by the hinge 18 so as to be openable and closable.

A speaker 12 is disposed on an upper portion of the inside surface of the upper cabinet 14, and a display unit 16 (corresponding to the display unit 130 in FIG. 1) is displayed on the main portion of the inside surface.

On the inside surface of the lower cabinet 25, a jog dial 20 which is a rotatable pressure switch is disposed in the upper center, left and right keys 26a and 26b are disposed on both sides thereof, and softkeys 17a and 17b are disposed on the outer sides. A combination of the so-called arrow key and determination key may be used instead of the jog dial 20 and the left and right keys 26a and 26b. Under these operation keys, a call key 21, a clear key 22, and a power/end key 23 are disposed. A numeric keypad 28 (including numerals 0 to 9 and symbols * and #) (corresponding to the text input unit 110 in FIG. 1) is disposed thereunder, and a memo key 30 and a manner key 31 are disposed further thereunder. A plurality of characters are assigned to each key of the numeric keypad 28. A microphone 32 is disposed at the lowest portion of the lower cabinet 25.

These specific configurations are merely illustrative examples, and the invention is not limited thereto.

Figure 3:
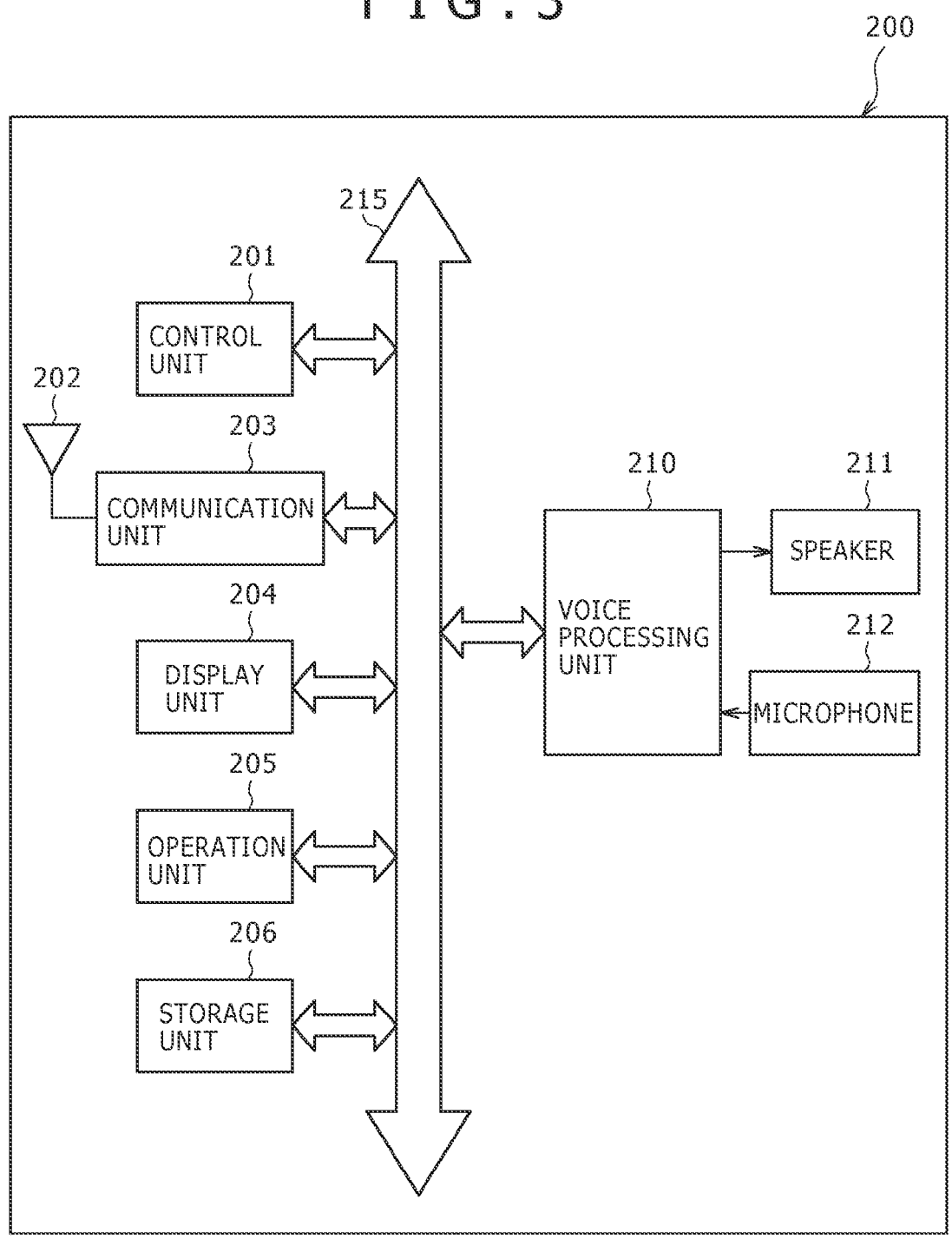
FIG. 3 is a block diagram showing a schematic hardware configuration of the cellular phone terminal shown in FIG. 2.

FIG. 3 is a block diagram showing a schematic hardware configuration of the cellular phone terminal 200 shown in FIG. 2.

The cellular phone terminal 200 includes a control unit 201, a communication unit 203, a display unit 204, an operation unit 205, a storage unit 206, and a voice processing unit 210 which are interconnected via a bus 215, and includes a speaker 211 and a microphone 212 which are connected to the voice processing unit 210.

The control unit 201 corresponds to the data processing unit 101 in FIG. 1, includes a CPU and the like, and controls each unit of the cellular phone terminal 200. The communication unit 203 includes an RF unit, a modulation/demodulation circuit, etc., and performs wireless communication for telephone calls, email, WEB data, etc. with a base station through an antenna 202.

The display unit 204 corresponds to the display unit 16 in FIG. 2, and operates as described above.

The operation unit 205 corresponds to the text input unit 110 in FIG. 1, has various keys such as control keys and a numeric keypad, and accepts an instruction from a user and a data input.

The storage unit 206 corresponds to the storage unit 120 in FIG. 1, includes memories such as ROM and RAM, and stores programs such as an OS and various applications executed by the CPU and data. The ROM can include a rewritable nonvolatile memory such as a flash memory.

The voice processing unit 210 includes a voice encoder, a voice decoder, a D/A converter, an A/D converter, and the like. The voice processing unit 210 outputs voice signals to the speaker 211 (including an earphone) and receives voice signals from the microphone 212.

The cellular phone terminal 200 also has the functions of a power supply, a light-emitting unit, a vibrator, etc. (not shown) which common cellular phone terminals have. Further, the cellular phone terminal 200 may have the functions of a camera and a contactless IC card.

Hereinafter, an operation example according to this embodiment will be described. In this example, when keys for inputting text in an application are operated on a standby screen, a text input operation can be performed before start-up of a desired application and the input text is displayed on the screen.

Input text can be used in various applications. Specific examples thereof are as follows:

(a) In a state where input text is displayed on a standby screen, an email creation screen is invoked in response to a one-time operation or a predetermined operation by the user. The input text is automatically embedded in a "body" area on the email creation screen. By inputting a "subject" and an "address" and adding a necessary attachment, the user can transmit email in the usual manner. Further, it is possible to edit the descriptions of the body.

(b) In a state where input text is displayed on a standby screen, the input text is automatically recognized as a search keyword in response to a one-time operation or a predetermined operation by the user. By connecting to a predetermined Web search engine, a search result is displayed by a Web browser.

(c) In a state where input text is displayed on a standby screen, the input text is automatically recognized as a keyword in response to a one-time operation or a predetermined operation by the user. By invoking a dictionary application installed in the terminal or connecting to a predetermined online dictionary, a dictionary search result for the keyword is displayed.

Figure 4:
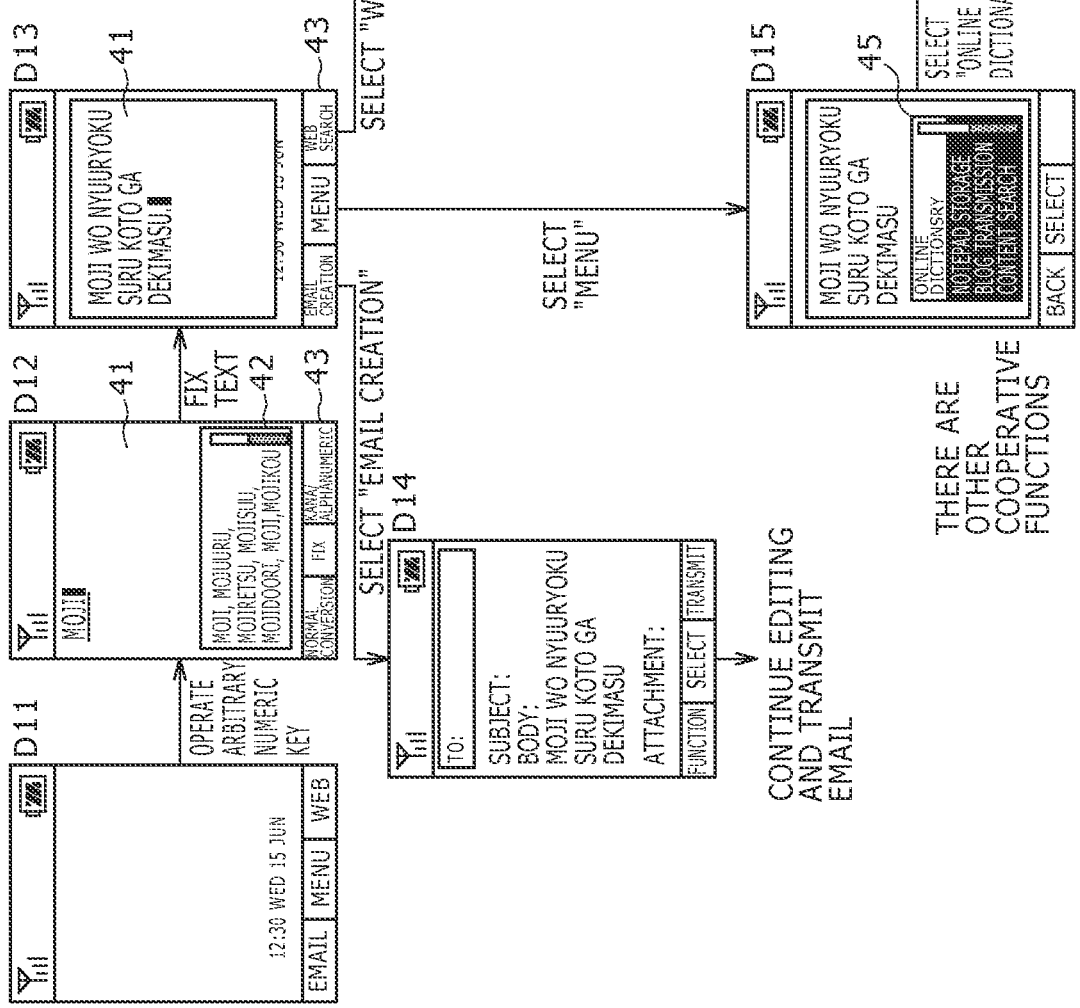
FIG. 4 is an illustration showing a screen transition example of a display unit illustrating a first operation example according to an embodiment of the invention.

Examples of other cooperative applications are as follows:
Blog editing and transmission
Chat function
Search for contents such as email, images, music data in the terminal
Functions and applications that the user wants to use, and setting menu search FIG. 4 shows a screen transition example of the display unit 204 illustrating a first operation example according to this embodiment. While the example of FIG. 4 illustrates the display screens of the cellular phone terminal, the first operation example is not limited to the cellular phone terminal and can be applied to an arbitrary information processing apparatus. That is, the operation unit does not necessarily require a numeric keypad for text input.

A screen D11 indicates a standby state after power-on, that is, an initial screen. In the case of the cellular phone terminal, a reception status, a remaining battery level, the date and time, and the like are displayed. In this state, when a user operates an arbitrary numeric key, the screen moves to a screen D12. On the screen D12, a text input area 41 for displaying input text and a conversion candidate display area 42 for displaying conversion candidates are provided, and a character (kana) corresponding to the operation of the numeric key is displayed in the text input area 41. Further, conversion candidates according to the input situation up to this point are displayed in the conversion candidate display area 42. In a softkey display area 43, "NORMAL CONVERSION" for kana-to-kanji conversion, "CONFIRMATION" for confirming input text, and "KANA/ALPHANUMERIC" for switching between kana and alphanumeric characters are displayed. These softkeys correspond to the keys 17a, 20, and 17b in FIG. 2, respectively. When the softkey "CONFIRMATION" is operated, the screen moves to a screen D13. On the screen D13, the conversion candidate display area 42 disappears, and application functions (i.e., action candidates) associated with text inputted and confirmed in the text input area 41 up to this point are displayed in the softkey display area 43. The example of FIG. 4 includes "EMAIL CREATION" for creating email, "MENU" for showing action candidates other than the actions listed in the softkey display area 43, and "WEB SEARCH" for searching for Web contents, as action candidates. Some information processing apparatuses, particularly cellular phone terminals have dedicated hardware keys for operations such as "EMAIL CREATION" and "WEB SEARCH". This embodiment can achieve the same result even in the case of operating the hardware keys instead of the softkeys for such functions. In this specification, an operation for designating a specific function directly without "MENU" with either a softkey or a hardware key is referred to as a "direct key operation".

Further, even after the operation of "CONFIRMATION", continuous text input can be performed if there is key input.

When "EMAIL CREATION" is selected on the screen D13, the screen moves to a screen D14. The screen D14 is an email creation screen where the text confirmed in the text input area 41 is automatically inputted in the "BODY". The email can be transmitted by adding an address and a subject.

When "MENU" is selected on the screen D13, the screen moves to a screen D15. The screen D15 displays a menu 45 showing action candidates associated with the confirmed text. While the example of FIG. 4 illustrates "ONLINE DICTIONARY", "NOTEPAD STORAGE", "BLOG TRANSMISSION", and "CONTENT SEARCH", the action candidates are not limited thereto.

When "ONLINE DICTIONARY" is selected from the menu 45 on the screen D15, the screen moves to a screen D17. On the screen D17, a connection is established with a dictionary search site on the Internet, where the confirmed input text is used as a keyword for translation. A screen D19 shows a translation result.

When "WEB SEARCH" is selected on the screen D13, the screen moves to a screen D16. On the screen D16, a connection is established with the Internet, where the confirmed input text is used as a keyword for search for relevant Web sites. A screen D18 indicates an example of the search result.

FIG. 5 is a flowchart showing a procedure corresponding to the first operation example shown in FIG. 4. This processing is implemented by software processing in the data processing unit 101 of FIG. 1.

After the terminal is turned on, an initial screen is displayed (S11). Then, key input from a user is accepted (S12). If there is key input, a text input screen such as the screen D12 is displayed (S13). If a conversion candidate is selected or confirmed (S14), a text input screen having text confirmed such as the screen D13 is displayed (S15). If there is new key input after that or before the confirmation, the flow returns to S12. As described above, the screen D13 shows action candidates relating to functions that can be selected by the user. If there is a direct key operation (S16), and if it is an "EMAIL CREATION" instruction, the screen moves to an email creation screen such as the screen D14 (S18). If it is a "WEB SEARCH" instruction, the screen moves to a Web search connection screen such as the screen D16 (S19).

If a "MENU" instruction is issued, a menu screen such as the screen D15 is opened (S17). If "ONLINE DICTIONARY" is selected on this screen, the screen moves to an online dictionary connection screen such as the screen D17 (S20). If "NOTEPAD STORAGE" is selected, the screen moves to a notepad screen (not shown) (S21). If "BLOC TRANSMISSION" is selected, the screen moves to a blog site connection screen (not shown) (S22). If "CONTENT SEARCH" is selected, the screen moves to a data folder search screen (not shown) (S23). If another function is selected, the screen moves to another screen (not shown) (S24).

As described, according to this embodiment, the information processing apparatus 100 accepts text input directly on the initial screen, and then shows actions associated with the input text to allow the user to select one. In particular, recent cellular phone terminals have multiple functions so that an operation for selecting a desired function is disadvantageously complicated. However, in the invention, available functions accompanied with text input are displayed in the softkey display area 43 by inputting text on the initial screen, which leads to a simple operation. Further, since the displayed functions are limited to ones accompanied with text input, the number of choices becomes smaller.

FIG. 6 shows a screen transition example of the display unit 204 illustrating a second operation example according to this embodiment. The second operation example is based on an information processing apparatus having a numeric keypad for text input such as the cellular phone terminal 200.

On a display screen of the second operation example, a text input area and a numeric input area are provided simultaneously. Either the text input area or the numeric input area is activated on a priority basis, in accordance with a condition. For example, in a state where text and numerals (numbers) are displayed simultaneously, if a text conversion candidate is selected by a user's operation, it is determined that the operation is performed for a text input purpose, and the "text input area" is activated on a priority basis.

In the case of text input, when the number of kana characters inputted in a state of kana before conversion reaches a predetermined number (e.g., seven characters), the corresponding kanji candidate or prediction candidate often does not exist. Accordingly, it can be considered that a user often performs a conversion or confirmation operation at the time of inputting a smaller number of kana characters. On the other hand, in the case where the number of kana characters consecutively inputted without a conversion or confirmation operation is not smaller than the predetermined number, there is a high probability that it is numeric input (i.e., telephone number input). Accordingly, in such a case, it is determined that the operation is performed for a numeric input purpose, and the "numeric input area" is automatically activated on a priority basis.

A standby screen D21 is an initial screen of the cellular phone terminal 200, as described above. In this state, when a user operates an arbitrary numeric key, the screen moves to a screen D22. In this example, the user operates a numeric key "7" five times in a row, operates a numeric key "3" twice in a row, and operates a key "***" once. This corresponds to the case where a kana character string "MOJI" is inputted in the cellular phone terminal. On the screen D22, there is provided a numeric input area (i.e., a telephone number input area) 44 as well as the text input area 41, the conversion candidate display area 42, and the softkey display area 43. In this operation example, the text input area 41 and the numeric input area 44 are enabled (i.e., activated) complementarily. In this example, the text input area 41 is initially enabled. In this context, to "enable" or "activate" relates to the use of input information, but does not affect the update of information displayed in the area. That is, even in an input area not enabled, information is updated in accordance with key input. In the example of FIG. 6**, while the text input area is active, updated "7777733*" is displayed in the numeric input area. The enabled area is indicated to the user by a focus 51 (a box around the area in FIG. 6). The indication form of the focus 51 is not limited thereto.

On the screen D22 as well as the screen D12, "NORMAL CONVERSION", "CONFIRMATION", and "KANA/ALPHANUMERIC" are displayed in the softkey display area 43.

When the softkey "CONFIRMATION" is operated, the screen moves to a screen D23. The example of FIG. 6 shows a case where a specific character string is selected from the conversion candidate display area 42 and the softkey "CONFIRMATION" is operated. On the screen D23, the conversion candidate display area 42 disappears, and action candidates associated with text inputted and confirmed in the text input area 41 up to this point are displayed in the softkey display area 43. The example of FIG. 6 shows "FUNCTION", "MENU", and "SWITCHING" as action candidates.

"FUNCTION" is a softkey for displaying a submenu related to the currently activated numeric input or text input. "MENU" is a menu for showing action candidates associated with the confirmed text.

When "MENU" is selected on the screen D23, the screen moves to a screen D27. The screen D27 displays a menu 46 showing action candidates associated with the confirmed text. The menu 46 includes "EMAIL CREATION" and "WEB SEARCH". As described above, a function having a hardware key can provide the same result even when the hardware key is operated instead of the softkey.

When "EMAIL CREATION" is selected on the screen D27, the screen moves to a screen D28. The screen D28 is an email creation screen where the text confirmed in the text input area 41 is inputted in the "BODY". The email can be transmitted by adding an address and a subject.

When "SWITCHING" is selected on the screen D23, the numeric input area 44 is enabled. That is, as shown in the screen D26, the focus 51 moves from the text input area 41 to the numeric input area 44. When the numeric input is enabled, "MENU" is changed to "ORIGINATION" in the softkey display area 43 on the screen D26. By selecting this "ORIGINATION", it is possible to perform an origination operation with the numeric string being a telephone number. When a "SWITCHING" operation is performed on the screen D26, the screen returns to the screen D23 where the text input area 41 is active.

Next, assume that numeric keys "0", "9", "0", "1", and "2" are consecutively operated on the initial screen D21. In this case, as shown in the screen D24, kana characters "WARAWAAKA" in the case of being interpreted as text input are displayed in the text input area 41. On the other hand, a numeric string "09012" is displayed in the numeric input area 44. The focus 51 is set to the text input area 41. Subsequently, a numeric key "3" is operated. At this time, as shown in the screen D25, a new kana character "SA" is added to the input character string, and a numeral "3" is additionally displayed in the numeric input area 44. At the same time, the focus 51 moves to the numeric input area 44. This is because in the second operation example according to this embodiment, if input information satisfies a predetermined condition, the numeric input is automatically enabled, that is, the focus 51 is moved from the text input area 41 to the numeric input area 44.

Conditions for automatically switching from the text input to the numeric input are, for example, as follows:

(1) A predetermined number of characters or more are consecutively inputted to the text input area 41. The predetermined number is, for example, seven. This is because it can be generally considered that there are few cases where such a number of characters are consecutively inputted without a conversion operation (including a confirmation operation). The predetermined number is not limited to seven, and may be variably set by the user. The number of characters inputted until the execution of a conversion operation varies with the preferences and habits of individual users, and variable setting can meet the preferences of individual users.

(2) Numeric keys are operated a predetermined number of times or more in a row. The predetermined number of times is, for example, ten. This is because it can be generally considered that there are few cases where numeric keys are operated such a predetermined number of times in a row without a conversion operation (including a confirmation operation). The predetermined number of times is not limited to ten, and may be variably set by the user.

(3) An input numeric string corresponds to one of the predetermined emergency numbers (110, 119, 118, etc. in Japan). However, when a numeric string in which a next numeral is inputted does not correspond to one of the emergency numbers, the activation is returned to the text input immediately. For example, when an input numeric string indicates "110", switching is automatically performed from the text input to the numeric input. Further, when a numeric string in which a next numeral is inputted does not correspond to one of the emergency numbers, the activation is automatically returned to the text input.

Although the screen D25 shows the example in which the six-digit numeral is used for an origination, in reality a more-digit numeral is inputted to perform an origination operation. Further, although the screen D26 shows the case in which the numeric string including an asterisk "*" is used for an origination, how to treat the asterisk "*" depends on the phone terminal. The screen D26 merely shows an example of switching from the text input to the numeric input.

FIG. 7 is a flowchart showing a procedure corresponding to the second operation example shown in FIG. 6. This processing is implemented by software processing in the control unit 201 of FIG. 3.

After the terminal is turned on, an initial screen is displayed (S31). Then, key input from a user is accepted (S32). If there is key input, it is determined whether a predetermined condition such as the above-described conditions for determining that the input is numeric input is satisfied (S33).

If the predetermined condition is not satisfied, a text/numeric input screen with the display of text conversion candidates such as the screen D22 is displayed (S34). At this time, the focus is set to the text input area. If a conversion candidate is selected or confirmed (S35), a text/numeric input screen having text confirmed such as the screen D23 is displayed (S36). If there is new key input after that or before the confirmation, the flow returns to S32. As described above, the screen D23 shows, in the softkey display area, "MENU" for showing action candidates relating to functions that can be selected by the user. If "MENU" is selected, a menu screen such as shown in the screen D27 is opened (S37). If "EMAIL CREATION" is selected by the user's operation, the screen moves to an email creation screen (S38). If "WEB SEARCH" is selected, the screen moves to a Web search connection screen (S39). If "ONLINE DICTIONARY" is selected, the screen moves to an online dictionary connection screen (S40). If "NOTEPAD STORAGE" is selected, the screen moves to a notepad screen (S41). If "BLOC TRANSMISSION" is selected, the screen moves to a blog site connection screen (S42). If "CONTENT SEARCH" is selected, the screen moves to a data folder search screen (S43). If another function is selected, the screen moves to another screen (not shown) (S44).

At step S36 if a "SWITCHING" operation is performed on the text/numeric input screen where the text input area is active (S51), the screen moves to a text/numeric input screen where the numeric input area is active. On the other hand, if a "SWITCHING" operation is performed on the text/numeric input screen where the numeric input area is active (S51), the screen moves to the text/numeric input screen where the text input area is active.

At step S33 if the condition of numeric input is satisfied, the text/numeric input screen (D26) where the numeric input area is active is displayed (S52). If an "ORIGINATION" operation is performed on this screen (S53), the screen moves to a call origination screen (S55). If "FUNCTION" is selected, the submenu of "ADDRESS BOOK REGISTRATION" etc. is opened (S54). If "ADDRESS BOOK REGISTRATION" is selected, the screen moves to an address book registration screen (S56). If another function is selected, the screen moves to another screen (S57).

While a preferred embodiment of the invention has been described, it should be understood by those skilled in the art that various modifications, combinations, sub-combinations and alterations may occur depending on design requirements and other factors insofar as they are within the scope of the appended claims or the equivalents thereof. For example, the user may determine whether or not to select a mode for assigning higher priority to the text input as an initial setting or a setting menu. The invention may be based on such a predetermined mode setting.

What is claimed is:

1. An information processing apparatus comprising:
    a display unit for displaying information on a display screen; and
    a control unit,
    wherein the control unit is configured to change an initial screen displayed on the display unit, which does not provide a text input function, to a screen displaying text a in a text input area based upon a user's textual input operation,
    wherein the control unit is configured to display a first softkey on the display screen that initiates a specific application using the displayed text and a second softkey on the display screen that searches for relevant Web sites using the displayed text based upon a user operation confirming the displayed text.

2. The information processing apparatus of claim 1, wherein the information processing apparatus is a cellular phone terminal.

3. The information processing apparatus of claim 1, wherein the initial screen is a screen that is displayed when the information processing apparatus is turned on.

4. The information processing apparatus of claim 1, wherein the specific application is an e-mail creation application.

5. The information processing apparatus of claim 1, wherein the first softkey is user-operable to display a menu of action candidates associated with the displayed text.

* * * * *